Patented May 31, 1949

2,471,818

UNITED STATES PATENT OFFICE 2,471,818

CARBOXYLATED RESINS AND METHOD OF MAKING SAME

Melvin J. Hunter and William C. Bauman, Midland, Mich., assignors to The Dow Chemical Company, Midland, Mich., a corporation of Delaware No Drawing. Application November 4, 1944, Serial No. 562,042

6 Claims. (Cl. 260—78.5)

This invention concerns certain new carboxylated resins and method of making the same.

The new resins provided by the invention are solid copolymers of an alpha·beta-unsaturated dicarboxylic acid, a readily polymerizable vinyl or vinylidene compound having only one olefinic group in the molecule, and a polymerizable organic compound which contains at least 2, e. g. from 2 to 9, olefinic groups in the molecule.

The new carboxylated resins are insoluble in aqueous solutions of alkalies such as sodium hydroxide, potassium hydroxide, or sodium carbonate, etc. They are well suited for use as cation exchange agents, since they readily absorb metal ions from neutral, alkaline or slightly acidic aqueous solutions to form metal salts of the resins and since they do not swell or shrink unduly during use in ion exchange processes. The ammonium and alkali metal salts of the carboxylated resins are particularly useful as agents for absorbing alkaline earth metal ions from brines containing such ions together with alkali metal ions, since they are exceptionally absorptive toward the alkaline earth metal ions as compared with their tendency to absorb or retain alkali metal ions. For instance, the carboxylated resins absorb and retain in chemically combined form a greater proportion of alkaline earth metal ions relative to alkali metal ions from a brine such as sea water than do sulphonated resins such as the well-known sulphonated phenol formaldehyde resins. The alkaline earth metal ions absorbed by the carboxylated resin may be recovered in a relatively concentrated form by treating the resin with a strong mineral acid such as hydrochloric or sulphuric acid. This treatment results in regeneration of the carboxylated resin so as to render it suitable for further use in a process for absorbing alkaline earth metal ions, or other heavy metal ions, from aqueous solutions containing the same.

The new carboxylated resins are also adapted to a variety of other uses, e. g. they may be employed as chemical agents for the preparation of esters or other derivatives thereof, or they may be used in making shaped articles such as are ordinarily prepared from other resinous materials.

As hereinbefore mentioned, the new carboxylated resins provided by the invention are copolymers of an alpha·beta-unsaturated dicarboxylic acid, a readily polymerizable vinyl or vinylidene compound having only a single olefinic group in the molecule and a polymerizable organic compound having a plurality of olefinic groups in the molecule. Examples of alpha·beta-unsaturated acids which may be used in making the resins are maleic acid, fumaric acid, citraconic acid, itaconic acid, etc. In place of these free acids, the corresponding acid anhydrides may be used. Examples of vinyl and vinylidene compounds which contain a single olefinic group and which may be used in making the products are styrene, alpha-methyl-styrene, ortho-methyl-styrene, meta-methyl-styrene, para-methyl-styrene, meta-ethyl-styrene, para-isopropyl-styrene, ortho-chloro-styrene, para-chloro-styrene, vinyl chloride, vinyl acetate, etc. Among the various polymerizable compounds containing 2 or more olefinic groups in the molecule which may be used in making the carboxylated resins are divinyl benzene, butadiene, isoprene, tung oil, oticica oil, divinyl ether, etc. The polyolefinic reactant serves as an agent for decreasing the tendency of the resin product to swell or shrink during use as a cation exchange agent. It is believed to function principally as an agent for bonding together, or vulcanizing the linear copolymers of the other reactants and only a very small proportion thereof, e. g. an amount as low as 0.01 mole per mole of the unsaturated dicarboxylic acid, need be used. It may, of course, be employed in much larger proportions. The alpha·beta-unsaturated dicarboxylic acid, or its anhydride, is used in amount such that its total unsaturation corresponds to between 0.6 and 1.0 of the total unsaturation of the sum of the other polymerizable starting materials. On a basis of the olefinic groups being the only reactive radicals in the starting materials (in which case one molecular equivalent of divinylbenzene would be two chemical equivalents of the compound and one molecular equivalent of either of the compounds styrene or maleic anhydride would correspond to one chemical equivalent thereof) the proportion of the alpha·beta-unsaturated dicarboxylic acid or its anhydride, corresponds to between 0.6 and 1.0 of the chemical equivalent of the sum of the other polymerizable starting materials. If desired, the alpha·beta-unsaturated dicarboxylic acid may initially be present in a proportion greater than those just stated, but in such instance the excess thereof remains unreacted and is occluded in the resinous product. The mono-olefinic vinyl or vinylidene compound is used in molecular excess over the polyolefinic reactant, but in amount not exceeding the molecular equivalent of the unsaturated dicarboxylic acid.

The resins may be formed by heating a mixture of the reactants in the proportions just stated to a polymerizing temperature, e. g. between 70° and 175° C., until the copolymeric product is a hard glass-like resin at room temperature. If desired, the reaction may be carried out in the presence of a solvent. The product may be comminuted and treated as usual with an alkali, e. g. with sodium or potassium hydroxide, to obtain an alkali metal salt of the resin. The salts thus obtained are hard, resinous, water-insoluble bodies having excellent cation exchange properties. Examples of such carboxylated resins are the copolymers of maleic anhydride, styrene, and divinyl benzene; of maleic acid, vinyl chloride, and divinyl benzene; and of itaconic acid, styrene and butadiene, etc., and the alkali metal salts thereof.

Procedures for employing the carboxylated resins and their salts as cation exchange agents, particularly for the recovery of magnesium ions in relatively concentrated form from sea water, are explained in detail in our copending application Serial No. 429,303, filed February 2, 1942, now U. S. Patent No. 2,409,861, of which this application is a continuation-in-part.

Such use of the resinous products is illustrated in the following examples which describe ways in which the principle of the invention has been applied and illustrate certain of its advantages, but are not to be construed as limiting the invention.

EXAMPLE 1

A solution of 90 parts by weight of purified styrene, 20 parts of divinyl benzene of 65 per cent purity (the remainder being largely ethyl-vinyl-benzene along with some styrene), 100 parts of maleic anhydride and 50 parts of acetone was heated at temperatures varying from 90° to 100° C. for 1.5 hours and then cooled. The product was a tough resinous solid at room temperature. It was reheated to 135° C. and maintained at said temperature for 2 hours, after which it was cooled and ground. The granular product was reheated to 135° C. at about 25 millimeters absolute pressure for approximately 5 hours to vaporize the acetone and any other volatile ingredients therefrom and again cooled. The product was screened to eliminate granules of sizes greater than 16 mesh and finer than 60 mesh. The remaining resin was soaked in an aqueous sodium hydroxide solution of 5 per cent concentration for about 16 hours, after which it was washed thoroughly, first with distilled water and then with a 5 per cent concentrated aqueous sodium chloride solution. A glass tube of 1 inch internal diameter was charged with 25.2 cubic inches of the resultant sodium salt of the resin and a 0.1 normal magnesium sulphate solution was passed through the tube until the resin had absorbed its capacity of magnesium ions from the liquor, as evidenced by an increase in the magnesium content of the effluent liquor. It was found that the resin had absorbed approximately 0.38 gram atomic weight of magnesium ions. The tube was drained of free-flowing liquor, after which 500 cubic centimeters of an aqueous hydrochloric acid solution of 15 per cent concentration was passed into and through the same. The resultant magnesium chloride solution, which contained nearly all of the magnesium that had been absorbed by the resin, was collected in successive portions as it flowed from the tube. 80 per cent of the magnesium that had been absorbed by the resin was collected in the richer mid-portions of the regenerated magnesium chloride solution, which mid-portions amounted to 200 cubic centimeters of liquor and contained an average of 147 grams of magnesium chloride per liter.

EXAMPLE 2

The procedure of Example 1 was repeated, except that instead of using aqueous hydrochloric acid to displace the absorbed magnesium ions from the resin, 500 cubic centimeters of a 12.5 per cent concentrated aqueous sodium chloride solution was employed. Only 45 per cent of the magnesium ions absorbed by the resin was displaced therefrom and the resultant solution contained 18 grams per liter of magnesium chloride.

EXAMPLE 3

The purpose of this example is to show the results obtainable when using a carboxylated resin for the absorption of magnesium ions from a brine as compared with those obtainable when using a sulphonated resin for said purpose. Due to the fact that absorbed magnesium ions are best displaced from a carboxylated resin by treatment with an acid, whereas they are best displaced from a sulphonated resin by treatment with an alkali metal salt solution, the procedure employed in using the two resins was not the same. However, the brines employed as starting materials were identical in the two experiments and each resin was used in the form of its sodium salt for the absorption of the magnesium ions from the brines.

EXPERIMENT A.—USING A CARBOXYLATED RESIN

The sodium salt of the resin described in Example 1 was employed. A glass tube of 1 inch internal diameter was charged with 25.2 cubic inches of the finely divided resin and a 0.1 normal magnesium chloride solution was passed through the resin bed until the latter had absorbed its capacity of magnesium ions (as evidenced by the fact that the liquor then flowing from the tube was a 0.1 normal magnesium chloride solution). The effluent liquor was collected and analyzed for magnesium chloride, whereby it was found that magnesium ions equivalent to 35.95 grams of magnesium chloride ($MgCl_2$) had been absorbed by the resin. The absorption of magnesium corresponded to 5.4 pounds of magnesium chloride per cubic foot of resin initially employed. 500 cubic centimeters of an aqueous hydrochloric acid solution of 15 per cent concentration was then passed through the resin bed and the resultant regenerated magnesium chloride solution was collected in portions as it flowed from the bed. All of the magnesium which had been absorbed by the resin was recovered as magnesium chloride in the effluent liquor. The highest concentration of magnesium chloride found in any of the portions of the regenerated magnesium chloride solution was 163 grams per liter. 80 per cent of the regenerated magnesium chloride was recovered in 200 cc. mid-portions of the effluent liquor, which mid-portions contained an average of 147 grams of magnesium chloride per liter. An aqueous solution containing 10 per cent by weight of sodium chloride and 5 per cent of sodium hydroxide was passed through the bed of resin to again form the sodium salt of the latter. A synthetic brine having approximately the sodium chloride and magnesium chloride content of sea water (i. e. containing 2.5 per cent by weight of sodium chloride and 0.5 per cent of magnesium chloride) was passed through the bed of resin until the brine flowing from the bed was of the same composition as that entering the bed. The effluent liquor was again collected and analyzed for magnesium chloride, whereby it was found that the resin had absorbed magnesium ions from the brine in amount corresponding to 29.68 grams of magnesium chloride. The amount of magnesium absorbed from this sodium chloride-containing brine was 82.5 per cent of that which the resin had previously absorbed from the solution of magnesium chloride alone.

EXPERIMENT B.—USING A SULPHONATED RESIN

The finely divided sodium salt of Amberlite IR–1 (a sulphonated phenol-formaldehyde resin) was used in this experiment. A glass tube of 1 inch internal diameter was charged with 31.5 cubic inches of this resin and a 0.1 normal aqueous magnesium chloride solution was passed through the bed of resin until the latter had absorbed its capacity of magnesium ions therefrom. The amount of magnesium absorbed corresponded to 2.1 pounds of magnesium chloride per cubic foot initial volume of the resin. One liter of a 12.5 per cent concentrated aqueous sodium chloride solution was then passed through the bed of resin and the resultant regenerated magnesium chloride solution was collected in 100 cubic centimeter portions as it flowed from the bed. The first 500 cubic centimeters of said solution to flow from the bed contained 16.31 grams of magnesium chloride, an amount corresponding to 93 per cent of the magnesium which had been absorbed by the resin. The 100 cubic centimeter portion of the solution which was richest in magnesium chloride contained 69 grams of magnesium chloride per liter. Eighty per cent of the magnesium which had been absorbed by the resin was recovered in mid-portions of the regenerated magnesium chloride solution having an average magnesium chloride content of 42 grams per liter. The procedure just described was repeated except that synthetic sea water, instead of the 0.1 normal magnesium chloride solution, was used as the liquor from which magnesium ions were absorbed by the resin. Magnesium ions were absorbed from the synthetic sea water in amount corresponding to 1.2 pounds of magnesium per cubic foot of the granular resin.

The comparative data collected in the foregoing experiments A and B is summarized in the following table:

Table

| Resin | Maximum Capacity Pounds of $MgCl_2$ Cubic Foot of Resin | Capacity from Sea Water Pounds of $MgCl_2$ Cubic Foot of Resin | Maximum Conc. of Regenerated $MgCl_2$ Grams per Liter | $MgCl_2$ in Richest 80% of Regenerated $MgCl_2$ Solution Grams per Liter |
|---|---|---|---|---|
| Carboxylated | 5.4 | 4.5 83.4% of Max | 163 | 147 |
| Sulphonated | 2.1 | 1.2 57.2% of Max | 69 | 42 |

In the claims, the term "vinylidene compounds" is to be construed as of a scope generic to "vinyl compounds."

Other modes of applying the principle of the invention may be employed instead of those explained, change being made as regards the method or products herein disclosed, provided the steps or compounds stated by any of the following claims or the equivalent of such stated steps or compounds be employed.

We therefore particularly point out and distinctly claim as our invention:

1. A synthetic resin consisting of an alkali-insoluble copolymer of an alpha-beta-unsaturated dicarboxylic acid, a vinylidene compound containing a single olefinic group in the molecule, and divinylbenzene, chemically combined in proportions of more than 1 mole of the vinylidene compound having a single olefinic linkage in the molecule per mole of the divinylbenzene, at least 1 mole of the alpha-beta-unsaturated dicarboxylic acid per mole of the vinylidene compound having only a single olefinic linkage in the molecule, and between 0.6 and 1 mole of said alpha-beta-unsaturated dicarboxylic acid per chemical equivalent of the polymerizable compounds other than the alpha-beta-unsaturated dicarboxylic acid.

2. An alkali metal salt of a synthetic resin, which synthetic resin consists of an alkali-insoluble copolymer of maleic acid, styrene, and divinylbenzene, chemically combined in the proportions of between 0.6 and 1 mole of maleic acid per chemical equivalent of the other polymerizable compounds, at least 1 mole of the maleic acid per mole of styrene and more than 1 mole of styrene per mole of divinylbenzene.

3. A magnesium salt of a synthetic resin, which synthetic resin consists of an alkali-insoluble copolymer of maleic acid, styrene, and divinylbenzene, chemically combined in the proportions of between 0.6 and 1 mole of maleic acid per chemical equivalent of the other polymerizable compounds, at least 1 mole of the maleic acid per mole of styrene, and more than 1 mole of styrene per mole of divinylbenzene.

4. A synthetic resin of the group consisting of (1) alkali-insoluble copolymers of an alpha-beta-unsaturated dicarboxylic acid, a vinylidene compound containing a single olefinic group in the molecule, and divinylbenzene, chemically combined in proportions of more than 1 mole of the vinylidene compound having a single olefinic linkage in the molecule per mole of the divinylbenzene, at least 1 mole of the alpha-beta-unsaturated dicarboxylic acid per mole of the vinylidene compound having only a single olefinic linkage in the molecule, and between 0.6 and 1 mole of said alpha-beta-unsaturated dicarboxylic acid per chemical equivalent of the polymerizable compounds other than the alpha-beta-unsaturated dicarboxylic acid, (2) alkali metal salts of said copolymers, and (3) magnesium salts of said copolymers.

5. A salt selected from the class consisting of the alkali metal and magnesium salts of the resin described in claim 1.

6. A synthetic resin consisting of an alkali-insoluble copolymer of maleic acid, styrene, and divinyl benzene, chemically combined in the proportions of between 0.6 and 1 mole of maleic acid per chemical equivalent of the other polymerizable compounds, at least one mole of the maleic acid per mole of styrene, and more than one mole of styrene per mole of divinyl benzene.

MELVIN J. HUNTER.
WILLIAM C. BAUMAN.

REFERENCES CITED

The following references are of record in the file of this patent:

UNITED STATES PATENTS

| Number | Name | Date |
|---|---|---|
| 2,089,444 | Staudinger et al. | Aug. 10, 1937 |
| 2,047,398 | Voss et al. | July 14, 1938 |
| 2,205,108 | Rosen | June 18, 1940 |
| 2,234,948 | Bradley | Mar. 18, 1941 |
| 2,313,728 | Austin et al. | Mar. 16, 1943 |
| 2,340,110 | D'Alelio | Jan. 25, 1944 |
| 2,383,399 | Lundquist | Aug. 21, 1945 |

FOREIGN PATENTS

| Number | Country | Date |
|---|---|---|
| 598,732 | Germany | June 16, 1934 |